United States Patent [19]

Inoue et al.

[11] Patent Number: 5,205,928

[45] Date of Patent: * Apr. 27, 1993

[54] PROCESS FOR THE PREPARATION OF MICROSPHERICAL SINTERED BODIES OF HYDROXYAPATITE AND A CHROMATOGRAPHIC PACKING MATERIAL COMPRISING THE MICROSPHERICAL SINTERED BODIES OF HYDROXYAPATITE

[75] Inventors: Senya Inoue; Akira Ono; Nobuyuki Otaki, all of Soka, Japan

[73] Assignee: Kanto Kagaku Kabushiki Kaisha, Tokyo, Japan

[*] Notice: The portion of the term of this patent subsequent to Apr. 28, 2009 has been disclaimed.

[21] Appl. No.: 774,512

[22] Filed: Oct. 8, 1991

Related U.S. Application Data

[60] Division of Ser. No. 704,732, May 20, 1991, Pat. No. 5,108,956, which is a continuation of Ser. No. 321,879, Mar. 10, 1989, abandoned.

[30] Foreign Application Priority Data

Mar. 11, 1988 [JP] Japan ................................ 63-56233

[51] Int. Cl.$^5$ ...................... B01D 15/08; C01B 25/32; C04B 35/00; C04B 38/06
[52] U.S. Cl. ............................. 210/198.2; 210/502.1; 210/510.1; 423/308; 423/311; 501/1; 501/81
[58] Field of Search ........................ 423/308, 309, 311; 501/1, 81; 210/502.1, 510.1, 198.2

[56] References Cited

U.S. PATENT DOCUMENTS 4,301,020 11/1981 Johnson, Jr. et al. .
4,497,075 2/1985 Niwa et al. .
4,711,769 12/1987 Inoue et al. .
4,794,171 12/1988 Tagaya et al. .
4,836,994 6/1989 Inoue et al. ..................... 423/308

FOREIGN PATENT DOCUMENTS 0026090 4/1981 European Pat. Off. .
0205622 12/1986 European Pat. Off. .
0239970 10/1987 European Pat. Off. .
0242544 10/1987 European Pat. Off. .
61-146704 7/1986 Japan .
61-201612 9/1986 Japan .
62-67451 3/1987 Japan .
62-206445 9/1987 Japan .
62-230607 10/1987 Japan .

OTHER PUBLICATIONS

Tiselius et al. Apr. (1956) *Archives of Biochemistry and Biophysics*, 65:132-155.

*Primary Examiner*—Wayne Langel
*Attorney, Agent, or Firm*—Birch, Stewart, Kolasch & Birch

[57] ABSTRACT

Microspherical sintered bodies of hydroxyapatite are prepared according to a new specific process wherein a suspension having hydroxyapatite microparticles dispersed in water or an organic solvent or a mixture of water and an organic solvent compatible therewith is atomized into a heating zone maintained above 500° C. whereby spherical agglomerates of hydroxyapatite microparticles formed by drying and solidification of microdroplets of the suspension are sintered while the agglomerates are suspended in the heating zone. Microspherical sintered bodies of hydroxyapatite thus obtained, which may be modified by an optical heat treatment to adjust the surface area of the sintered body and growth of crystals therein, are useful in various fields of industry, for example, as a sorption agent in chromatographic separation.

8 Claims, No Drawings

PROCESS FOR THE PREPARATION OF MICROSPHERICAL SINTERED BODIES OF HYDROXYAPATITE AND A CHROMATOGRAPHIC PACKING MATERIAL COMPRISING THE MICROSPHERICAL SINTERED BODIES OF HYDROXYAPATITE

This application is a divisional of copending application Ser. No. 07/704,732 filed May 20, 1991, U.S. Pat. No. 5,108,956, which is a continuation of application Ser. No. 07/321,879 filed Mar. 10, 1989, abandoned. The entire contents of which are hereby incorporated by reference.

BACKGROUND OF THE INVENTION

1. Field of the Invention

The present invention relates to microspherical sintered bodies of hydroxyapatite and a new process for preparing same as well as a chromatographic packing material comprising the microspherical sintered bodies of hydroxyapatite. More particularly, the present invention relates to microspherical sintered bodies of hydroxyapatite which are excellent in mechanical strength, durability and reproducibility and suitable as a packing material (sorption agent) for liquid chromatography and a process for preparing same according to spray-firing as a new technical means as well as a chromatographic packing material comprising such microspherical sintered bodies.

2. Description of the Prior Art

From the past, hydroxyapatite possessing a unique performance as an adsorbent for bio-macromolecules, fluorine ion, heavy metal ions, etc. has been watched as a packing material (sorption agent) for liquid chromatography for the separation and purification of proteins, enzymes, nucleic acids and the like biological substances. In recent years, hydroxyapatite possessing such bio-compatibility is utilized also as bio-ceramic materials such as artificial bones and teeth and has a bright prospect in this art.

The fact that proteins can be adsorbed to calcium phosphate gel is known from the past. In chromatographic use, however, such gel gives too compact columns so that the gel fails to give a test solution a flow speed practical for column chromatography, thus making it difficult to use such gel for a chromatographic purpose. In case of using such calcium phosphate gel, therefore, it had to be mixed with a small amount of an auxiliary substance capable of facilitating passage of the solution through the column, such as Super-Gel before packing. However, such auxiliary substance may adsorb bio-macromolecules, thus making the result complicated. For the above reasons, the calcium phosphate gel is quite undesirable as a packing material for column chromatographic analysis of bio-macromolecules.

Since the technique for the preparation of hydroxyapatite utilizable for column chromatography was developed by Tiselius et al. [Arch. Biochem. Biophys., 65, 132–155 (1956)], hydroxyapatite for column chromatographic use has been prepared for a long time up to date according to their process or various processes wherein their process is modified. According to these processes, however, hydroxyapatite is obtained in the form of plate-like crystals or agglomerates of microcrystals and so has such a shortcoming that it is inferior in mechanical strength and tends to be destroyed during the packing operation and measurement. Thus, chromatographic characteristics of hydroxyapatite are changed according to the packing method used or in the course of the measurement so that problems arise in durability of the packing material and in trustfulness of the measurement.

In recent years, a process for producing microspherical hydroxyapatite was proposed to overcome the above mentioned shortcoming, utilizing the so-called spray-drying method which is widely used for manufacturing granules of a powdery substance (Japanese Laid-open Patent Appln. Nos. Sho. 62-206445 and 62-230607). According to the process disclosed in Japanese Laid-open Patent Appln. No. 62-206445, microcrystals of hydroxyapatite having a diameter of less than 1 $\mu$m as primary particles are physically coagulated by spray drying to form substantially spherical particles of 1–10 $\mu$m in diameter as second particles. Japanese Laid-open Patent Appln. No. Sho. 62-230607 discloses a process for preparing spherical agglomerates of apatite wherein a gelled hydroxyapatite slurry is sprayed into an atmosphere kept at 100°–200° C. to form spherical agglomerates of hydroxyapatite having a diameter of 1–10 $\mu$m. In case the spherical hydroxyapatite particles obtained according to such prior art processes are subjected to classification by screening to collect particles of a definite particle size as a packing material for liquid chromatography, the spherical particles tend to be destroyed because of their poor mechanical strength and will be broken to pieces when packed densely in a column under high pressure. Consequently, the spherical hydroxyapatite particles formed by spray drying have to be brought to a heat treatment carried out at a high temperature for a long period of time in order to impart to them mechanical strength sufficient enough to withstand high pressure on packing. Under such severe heat treatment, however, there arises a problem that the spherical particles tend to be bonded to one another in a mutually fused state to form partially solid state granules. Thus, the prior art processes involve a number of problems not only in the preparation of spherical hydroxyapatite particles but also in the use of the particles as a packing material for chromatographic purposes. Thus, there was a great demand for developing spherical sintered bodies of hydroxyapatite particles which are excellent in mechanical strength and chromatographic characteristics and easy in handling as well as a process for preparing same.

Under the above mentioned circumstances, one of the present inventors previously developed a process for preparing microspherical hydroxyapatite particles according to a specific spray-pyrolysis technique (Japanese Laid-open open Patent Appln. Nos. Sho. 61-146704 and 61-201612) as well as a packing material for chromatographic use comprised of microspherical hydroxyapatite particles possessing high mechanical strength and a process for preparing same (Japanese Laid-open Patent Appln. No. Sho. 62-67451). In these processes, a calcium compound and a phosphorus compound have to be dissolved, without permitting the formation of any precipitate, in a solution to be sprayed. In practice of these processes, therefore, some limitations were necessary in selection and combination of the starting materials.

The processes described just above are generally regarded desirable for the preparation of microspherical hydroxyapatite particles for chromatographic use. However, there is still room for improving the processes to obtain microspherical hydroxyapatite particles with desirable properties in a simpler operation.

BRIEF SUMMARY OF THE INVENTION

Accordingly, it is an object of the present invention to provide a process for the preparation of microspherical sintered bodies of hydroxyapatite possessing high mechanical strength and chromatographic characteristics.

It is another object of the present invention to provide a new process for the preparation of microspherical sintered bodies of hydroxyapatite in one step from a hydroxyapatite slurry according to a specific spray-firing method.

It is still another object of the present invention to provide microspherical sintered bodies of hydroxyapatite possessing high mechanical strength, good durability and high loading capacity for bio-macromolecules.

It is further object of the present invention to provide a chromatographic packing material comprising the microspherical sintered bodies of hydroxyapatite.

Other objects, features and advantages of the present invention will become apparent more fully from the following description.

DETAILED DESCRIPTION OF THE INVENTION

In order to improve further the processes described above, the present inventors have continuously made extensive researches on the preparation of hydroxyapatite particles with desirable properties. As a result of the researches, it has now been found that spherical sintered bodies of hydroxyapatite exhibiting high mechanical strength, good durability and excellent chromatographic characteristics such as loading capacity for protein and high resolution when used as a packing material for chromatographic separation of bio-macromolecules can be prepared in one step from a hydroxyapatite slurry according to a new process utilizing a specific spray-firing technique. The present invention has been accomplished on the basis of the above finding.

In accordance with the present invention, there is provided a process for the preparation of microspherical sintered bodies of hydroxyapatite in one step and instantaneously from slurried hydroxyapatite which process comprises atomizing the slurried hydroxyapatite into a heated atmosphere.

In one embodiment of the process, a suspension having hydroxyapatite microparticles dispersed in water or an organic solvent or a mixture of water and an organic solvent compatible therewith is atomized into a heating zone maintained above 500° C. whereby spherical agglomerates of hydroxyapatite microparticles formed by drying and solidification of microdroplets of the suspension are sintered while the agglomerates are suspended in the heating zone.

In another embodiment of the process, a suspension having hydroxyapatite microparticles dispersed in water or an organic solvent or a mixture of water and an organic solvent compatible therewith is atomized into a heating zone maintained above 500° C. whereby spherical agglomerates of hydroxyapatite microparticles formed by drying and solidification of microdroplets of the suspension are sintered while the agglomerates are suspended in the heating zone, and thereafter the resultant microspherical sintered bodies of hydroxyapatite is subjected to a heat treatment.

In accordance with the present invention, there are also provided microspherical sintered bodies of hydroxyapatite possessing high mechanical strength, good durability and excellent chromatographic characteristics, which are prepared according to the above process.

In accordance with the present invention, there is further provided a chromatographic packing material which comprises the microspherical sintered bodies of hydroxyapatite.

The present invention is featured by the structure and properties of the microspherical sintered bodies of hydroxyapatite. The structure of the microspherical sintered bodies is distinguished by spherical agglomerates in sintered state of plural hydroxyapatite microparticles wherein the individual hydroxyapatite microparticles are mutually sintered. Thus, the microspherical sintered bodies of hydroxyapatite possess high mechanical strength good durability and excellent chromatographic characteristics such as high loading capacity for protein and high resolution as described above. The present invention is also featured by the use of a specific spray-firing technique for preparing such microspherical sintered bodies of hydroxyapatite, which is differentiated from the so-called spray-drying method used in the prior art processes.

According to the process of this invention, a suspension (or slurry) of hydroxyapatite microparticles in water, an organic solvent or a mixture of water and an organic solvent compatible therewith is atomized into a heating zone above 500° C. whereby the liquid constituting the suspension (or slurry) is evaporated to form very small spherical agglomerates of hydroxyapatite microparticles. These spherical agglomerates are instantaneously fired while they are suspended in the atmosphere of the heating zone whereby the individual hydroxyapatite microparticles constituting the spherical agglomerates are subjected to sintering reaction to form spherical sintered bodies where the hydroxyapatite microparticles are mutually sintered to have a structure with high mechanical strength.

The above mentioned suspension (or slurry) having hydroxyapatite microparticles dispersed in water, an organic solvent or a mixture of water and an organic solvent compatible therewith will be referred to hereinafter simply as "the HAP slurry". By the specific term "spray-firing" is meant herein the treatment for the formation of the microspherical sintered bodies of hydroxyapatite instantaneously in one step from the HAP slurry by atomizing it into a heating zone above 500° C. to cause instantaneously both of the phenomena (a) evaporation of the solvent contained in the slurry in the form of microdroplets by drying and (b) the formation of spherical agglomerates of hydroxyapatite microparticles by solidification. The above mentioned spherical agglomerates of hydroxyapatite microparticles will be referred to hereinafter simply as "the HAP sphere".

In the prior art processes, on the contrary, similar microspherical sintered bodies of hydroxyapatite are prepared in two steps; the step of spray-drying an aqueous slurry of hydroxyapatite wherein the aqueous slurry is atomized into a heating zone to effect dehydration and drying of microdroplets of the slurry for obtaining agglomerates of hydroxyapatite microparticles and the step of granulating the agglomerates to form spherical granules of hydroxyapatite and heating the granules in a heat-resisting container placed in a furnace or the like heating source to effect sintering of the individual hydroxyapatite microparticles constituting the spherical granules. In some cases drying of the agglomerates of hydroxyapatite microparticles becomes insufficient only by the spray-drying step. In such cases a drying step over a long period of time is required in the prior art processes prior to the heat treatment for sintering. Thus, the prior art processes necessitate, in addition to the spray-drying operation for granulation of hydroxyapatite microparticles, a sintering treatment of the granulated hydroxyapatite spheres and a drying treatment provided between the spray-drying operation and the sintering treatment for preparing sintered spherical particles of hydroxyapatite for chromatographic use. Further, such drying and sintering treatments have to be carried out in the prior art processes separately from the spray-drying operation.

The spray-firing treatment in the process of this invention is, at a glance, similar to the spray-drying treatment in the prior art processes in that the HAP slurry or an aqueous slurry of hydroxyapatite microparticles is atomized into a heating zone where thermal energy is imparted to microdroplets of the slurry by using a heated gas or the like heating means. However, the spray-firing treatment of the present invention is fundamentally different from the conventional spray-drying treatment in the following point: A prime object of the conventional spray-drying resides in dehydration and drying of droplets of an aqueous slurry of hydroxyapatite microparticles to form agglomerates of hydroxyapatite microparticles wherein the individual microparticles are mechanically attached to one another. The temperature generally employed for spray-drying is insufficient to impart thermal energy sufficient to cause sintering reaction to dry spherical agglomerates of hydroxyapatite microparticles. Contrary to this, a prime object of the spray-firing treatment of the present invention is to effect, in addition to drying of the HAP spheres, a sintering reaction of hydroxyapatite microparticles constituting the HAP spheres. In the spray-firing treatment, therefore, a thermal energy much higher than that for the spray-drying treatment is required which must be sufficient enough to attain not only dehydration and drying of the HAP slurry for the formation of the HAP spheres but also sintering reaction of the individual hydroxyapatite microparticles constituting the HAP spheres. Thus, a temperature higher than 500° C. far beyond the temperature range for spray-drying is required in the heating zone. According to the process of this invention, a great advantage is achieved in that microspherical sintered bodies of hydroxyapatite can be obtained instantaneously by dehydration and drying of the HAP slurry followed by sintering of the resultant HAP spheres while they are suspended in the space of the heating zone.

In the process of this invention, discrete HAP spheres are heated while being suspended in the atmosphere of the heating zone so that the partial pressure of water vapor in the atmosphere surrounding the individual HAP spheres becomes equal. Further, only the hydroxyapatite microparticles constituting the HAP spheres are mutually sintered, thus enabling to prevent occurrence of an undesirable phenomenon that the HAP spheres (or microspherical sintered bodies of hydroxyapatite) are mutually bonded by sintering. As the partial pressure of water vapor in the atmosphere surrounding the individual HAP spheres is equal, an especially remarkable merit is achieved in case of using the resultant microspherical sintered bodies of hydroxyapatite as a chromatographic packing material. Hydroxyapatite contains OH groups as crystal water and loses a part of the OH groups by heating. In this case, the degree of deficiency in crystal water is influenced by the partial pressure of water vapor in the atmosphere of the heating zone. On the other hand, the degree of deficiency in crystal water (or the number of OH groups) in hydroxyapatite crystal is greatly influenced on chromatographic characteristics in case of using hydroxyapatite as a packing material for chromatography. Accordingly, it is of importance that characteristics of the individual microspherical sintered bodies of hydroxyapatite, including the degree of deficiency of OH groups, are same.

In the prior art processes, however, agglomerates of hydroxyapatite particles formed and dried according to spray-drying are firstly granulated and then heated for a long period of time in a heat-resistant container for sintering. In case the spherical hydroxyapatite granules are placed in the container, the atmosphere surrounding the granules on the superficial portion is different in partial pressure of water vapor and in easiness in removal of any residual gas contained in the granules from the atmosphere surrounding the granules positioned in the bottom portion, thus permitting occurrence of difference in atmosphere surrounding the individual granules. Such difference apparently causes fluctuation in characteristics of the individual hydroxyapatite microparticles. In case the spherical hydroxyapatite granules are sintered in a rotary kiln under rotation or the like heating means so as to make the atmosphere surrounding the individual granules as similar as possible, the spherical granules having been dried but not yet been sintered are so poor in mechanical strength that the granules may be destroyed prior to being sintered. In case of the prior art processes wherein the preparation of the spherical sintered bodies of hydroxyapatite is carried out stepwise, it is difficult to obtain the product having satisfactory characteristics. What is more, the firing treatment in the prior art processes of spherical hydroxyapatite granules tends to give a product wherein the granules have mutually been sintered as the individual granules are contacted with one another in the container. Accordingly, the microspherical sintered bodies of hydroxyapatite obtained in the prior art are not uniform in size and are inconvenient in handling.

In general, hydroxyapatite suitable as a chromatographic packing material is the so-called Ca-deficient type hydroxyapatite wherein the ratio of Ca to P, i.e. Ca/P, is smaller than the theoretical ratio. As the Ca-deficient type hydroxyapatite is easily decomposed by heating, it is especially important to prevent decomposition of the hydroxyapatite by maintaining moderately the partial pressure of water vapor in the firing atmosphere and shortening the heating time. In the process of this invention wherein an inflammable organic solvent such as an alcohol is used as a dispersion medium for the preparation of the HAP slurry, the merit of this invention is maximally increased. When the HAP slurry using an inflammable organic solvent as a dispersion medium thereof is atomized into a heating zone, the solvent was evaporated and burnt by flame in the heating zone whereby the heat of combustion of the organic solvent can be utilized as a heat source for heating, drying and firing the HAP slurry. Moreover, water vapor formed by the combustion of the organic solvent affords a moderate partial pressure of water vapor in the atmosphere of firing the HAP spheres. Thus, there is no necessity of external supply of partial pressure of water vapor.

According to the process of this invention, the HAP spheres formed by atomization of the HAP slurry are dried and fired within an extremely short period of time while the HAP spheres are suspended in the heating zone so that the steps for the preparation of microspherical sintered bodies of hydroxyapatite and the time required for such preparation can be minimized, thus bringing about a great industrial merit in the preparation of hydroxyapatite. Further, the process of this invention enables to maintain the atmosphere surrounding the individual HAP spheres quite even throughout the firing treatment so that microspherical sintered bodies of hydroxyapatite suitable as a chromatographic packing material can be provided.

In practice of the process of this invention, any type of commercially available hydroxyapatite can be used as a starting material. Alternatively, hydroxyapatite utilizable as a starting material can be prepared as needed according to any desirable method discribed in the relevant publications. Thus, the method for preparing hydroxyapatite is not specified in the present invention but the following methods can be mentioned as typical examples of the method recommended for preparing hydroxyapatite:

(1) The so-called wet process known, for example, as Tiselius method [A. Tiselius, et al., Arch. Biochem. Biophys., 65, 132-155 (1956)] wherein hydroxyapatite microparticles are precipitated from an aqueous solution by a direct ionic reaction.
(2) The so-called dry process according to a solid-state reaction between a calcium compound and a phosphorous compound.
(3) The hydrothermal synthesis wherein a reaction is carried out between a calcium compound and a phosphorus compound in the presence of steam at high temperature and pressure.

A solution containing a precipitate of hydroxyapatite microparticles formed according to the wet process (1) may directly be used as the HAP slurry.

No particular limitation exists in the particle size of hydroxyapatite used in the process of this invention. To obtain a stable suspension of hydroxyapatite wherein hydroxyapatite microparticles are kept in a better dispersed state, it is desirable that the particle diameter of hydroxyapatite is 1 μm or less.

The dispersion medium used for the preparation of the HAP slurry is selected from water, an organic solvent and a mixture of water and an organic solvent compatible therewith. Any kind of organic solvent can be used for the present invention except that the organic solvent should not be viscous or non-combustible. In general, therefore, the organic solvent is selected from easily combustible, volatile, non-viscous, liquid organic substances. Standing on the above viewpoint, a lower alkanol with 1-8 carbon atoms, a lower alkane with 6-8 carbon atoms, a lower dialkyl ketone with 3-8 carbon atoms, an aromatic hydrocarbon with 6-8 carbon atoms and a dialkyl ether with 3-8 carbon atoms are preferable for the present invention. Illustrative of the preferable organic solvent are, for example, methanol, ethanol, propanol, butanol, pentanol, hexanol, heptanol, octanol, hexane, octane, acetone, methyl ethyl ketone, diethyl ketone, methyl isobutyl ketone, benzene, toluene, xylene, diethylether, ethyl propyl ether and dipropyl ether. When a mixture of water and an organic solvent is used as a dispersion medium, the organic solvent must be compatible with water, without forming a heterogenous phase. Accordingly, the organic solvent in this case is preferably miscible with water, for example, a lower alkanol such as methanol or ethanol, a ketone such as acetone or methyl isobutyl ketone. In case a mixture of water and an organic solvent is used as a dispersion medium, any of the mixing ratios can be used.

Any of the mixing means such as a stirrer can be used for prepaing the HAP slurry. No particular limitation exists in the concentration of hydroxyapatite in the HAP slurry. The concentration may be varied according to the kind of atomizing nozzle used, the diameter of nozzle, the pressure for atomization of the HAP slurry and the viscosity of the HAP slurry as well as the size of the microspherical sintered bodies of hydroxyapatite to be prepared and the intended use thereof. Mixing of hydroxyapatite with the dispersion medium by the aid of a mixer, stirrer or a homogenizer can be carried out at ambient temperature.

The term "hydroxyapatite" used herein includes, in addition to hyroxyapatite of a stoichiometric composition $[Ca_{10}(PO_4)_6(OH)_2]$, the so-called Ca-deficient type hydroxyapatite wherein the content of calcium is smaller than the theoretical value, a modified hydroxyapatite synthesized by varying the ratio of calcium to phosphorus, and a substance consisting substantially of hydroxyapatite with a small amount of other compounds such as tricalcium phosphate. These can be used alone or in mixture as hydroxyapatite for the present invention. for the present invention.

The HAP slurry thus prepared is atomized into a heating zone maintained at a temperature above 500° C. Any type of the conventional atomizers with a proper nozzle, such as those equipped with a pressure nozzle or a two-fluid nozzle can be used for this purpose.

The term "heating zone" used herein means a confined space with an inlet and an outlet maintained at a given temperature above 500° C. by flame formed by combustion of a combustible gas, a gas furnace, an electric furnace or a stream of a high temperature gas. Other suitable heat sources can also be used for providing the heating zone.

When the HAP slurry is atomized into such heating zone, microdroplets of the slurry formed are suddenly heated at a high temperature whereby the dispersion medium contained in the microdroplets is instantaneously evaporated and/or burnt, leaving microparticle of hydroxyapatite. The microparticles of hydroxyapatite thus formed are agglomerated to form the HAP spheres which are also heated in the zone while being suspended therein whereby the hydroxyapatite microparticles constituting the HAP spheres are subjected to sintering reaction and mutually bonded.

As briefly referred to hereinbefore, remarkable advantages are obtained in the present invention when a combustible organic solvent or a mixture of water and an organic solvent which is combustible and miscible with water is used as a dispersion medium for the HAP slurry. In case the HAP slurry containing such dispersion medium is atomized into the heating zone maintained above 500° C., the combustible organic solvent contained therein is instantaneously evaporated and burnt whereby the heat of combustion is evolved as high heat energy which can effectively utilized as a heat source necessary for sintering reaction of the hydroxyapatite microparticles in the HAP spheres. In this embodiment, a narrow space surrounding the individual HAP spheres can instantaneously be heated to a high temperature so that the heat can effectively be utilized. Accordingly, the preparation of a large amount of the microspherical sintered bodies of hydroxyapatite per unit time becomes possible according to this embodiment, thus bringing about significant industrial merits. As the combustion of the organic solvent accompanies the generation of water, a moderate partial pressure of water vapor can be imparted to the atmosphere surrounding the HAP spheres when the hydroxyapatite microparticles consituting the HAP spheres are mutually sintered. Thus, there is no necessity of supplying water vapor externally which is necessary in the atmosphere when hydroxyapatite containing OH groups as crystal water. This is another merit of this embodiment. It is widely known that reactions for liberation of the OH groups in hydroxyapatite and for decomposition are accelerated when water vapor is absent or insufficient in the atmosphere where hydroxyapatite is sintered. Thus, the process of this invention wherein water generated on the combustion of a combustible organic solvent can effectively be utilized can be said to be a highly desirable sintering method.

Among the heat sources mentioned above and used in the heating zone, a gas furnace is desirably used for accelerating evaporation of the dispersion medium, especially containing water. It is of course possible to use combustion of a gas in the furnace jointly with combustion of the organic solvent as a heating source. The microspherical sintered bodies of hydroxyapatite thus obtained can be collected by a proper recovering means such as a cyclone.

The microspherical sintered bodies of hydroxyapatite of this invention obtained according to the above process are usually from 0.5 $\mu$m to several ten um in diameter and possess high mechanical strength. This product can be used as such for chromatography as a packing material (sorption material). Alternatively, the product may be classified according to a known conventional screening method to obtain a fraction having a definite particle diameter, considering its high mechanical strength.

If necessary, the product may further be subjected to a heat treatment conducted at 500°-900° C. for a proper period of time according to the intended purpose, for example, by using a gas furnace, an electric furnace or the like heating means. This optional heat treatment is useful for adjusting the surface area of the sintered bodies or the degree of crystal growth, or for removing any contaminant such as any remaining gas in the microspherical sintered bodies. As the microspherical sintered bodies of hydroxyapatite of this invention has such a structure that the individual hydroxyapatate microparticles have mutually been sintered, there is no fear of further bonding of the sintered bodies by the optional heat treatment. Thus, the product of this invention is very convenient in handling.

The present invention will now be illustrated in more detail by way of Examples.

EXAMPLE 1

(1) Preparation of microspherical sintered bodies of hydroxyapatite

Hydroxyapatite microparticles of 0.2 $\mu$m or less in diameter synthesized according to the wet process were dispersed in a mixture of water and methanol (1:1) and the dispersion was vigorously stirred to form a HAP slurry having a concentration of 1 mol/liter. The HAP slurry and compressed air were supplied at rates of 10 ml/min and 10 liters/min, respectively, to a two-fluid nozzle and then atomized into flame of a burner whereby the methanol in the HAP slurry was evaporated and burned by the flame. Microdroplets of the HAP slurry formed by atomization were instantaneously heated to about 580° C. to form microparticles by the heat of the flame and the heat of combustion of the methanol. These microparticles were collected by a cyclone and subjected to scanning electron microscopy and X-ray diffraction analysis. As a result of the analyses, the microparticles were found to be spherical sintered bodies of hydroxyapatite having a particle size of 1-16 $\mu$m wherein the individual hydroxyapatite microparticles had been mutually sintered and growth of crystals had occurred.

(2) Liquid chromatography

The spherical sintered bodies of hydroxyapatite obtained in the above (1) were classified with the aid of an air-classifier and only those having a diameter of 4-8 $\mu$m were collected. The spherical sintered bodies of hydroxyapatite thus collected were subjected to a heat treatment conducted for 3 hours at 750° C. to obtain a packing material for liquid chromatography.

A stainless steel column (8 mm in inner diameter, 100 mm in length) was charged with the packing material according to a slurry packing method under pressure of 300 kg/cm$^2$.

Using this column, the measurement of a mixed sample consisting of bovine serum albumin, lysozyme (egg white) and cytochrome C (horse heart) was repeatedly carried out at a flow rate of 1.0 ml/min to check reproducibility of the column according to a linear gradient method (from 0.01M to 0.3M in 60 min) using a sodium phosphate buffer solution having a pH value of 6.8. As a result of the measurement repeated 58 times in all, the fluctuation coefficient in retention time of each sample was recorded as 1.30% in case of bovine serum albumin, 0.72% in case of lysozyme and 0.67% (reduced form) or 0.90% (oxidized form) in case of cytochrome C, thus showing extremely high reproducibility. By the way, the retention time of each sample in the first and the 58th measurements was as shown in the following table:

TABLE

| Sample | Measurement | |
|---|---|---|
| | 1st | 58th |
| Bovine serum albumin | 17.84 min | 17.13 min |
| Lysozyme | 27.33 min | 28.06 min |
| Cytochrome C (reduced) | 44.30 min | 45.42 min |
| Cytochrome (oxidized) | 47.16 min | 48.74 min |

The number of theoretical plates per column in the first measurement showed a value as high as 11600 while that in the 58th measurement showed 11800 which was in agreement with the value in the first measurement within a statistical error. The column permitted no change in the number of theoretical plates even after the use of many times, thus showing a very good durability. The loading capacity of the column for protein was checked by adsorbing thereto 40 mg of lysozyme whereby it was found that all of the lysozyme was adsorbed to the column.

In view of the above results, it was found that the spherical sintered bodies of hydroxyapatite concerned with this invention were very useful as a chromatographic packing material.

EXAMPLE 2

Hydroxyapatite microparticles of 0.3 μm or less in diameter were dispersed in ethanol and the dispersion was vigorously stirred to form a HAP slurry having a concentration of 0.5 mol/liter. The HAP slurry was atomized into flame of a burner in the same manner as described in Example 1 by the aid of a two-liquid nozzle whereby the ethanol in the HAP slurry was evaporated and burned by the flame. Microdroplets of the HAP slurry formed by atomization were instantaneously heated to about 1360° C. to form microparticles by the heat of the flame and the heat of combustion of the ethanol. These particles were collected by a cyclone and subjected to scanning electron microscopy and X-ray diffraction analysis. As a result of the analyses, the microparticles were found to be spherical sintered bodies of hydroxyapatite having a particle diameter of 0.5–14 μm wherein the individual hydroxyapatite microparticles had been mutually sintered and growth of crystals had occurred.

EXAMPLE 3

Hydroxyapatite microparticles of 0.2 μm or less in diameter were dispersed in water and the dispersion was vigorously stirred to form a HAP slurry having a concentration of 0.3 mol/liter. A distilling flask was connected to one end of a tubular furnace in such manner that the air in the furnace heated at 1200° C. might be sucked by an aspirator. The HAP slurry was atomized by the aid of a pressure nozzle into the furnace at a flow rate of 1 ml/min, and the microparticles formed was collected in the flask. Microdroplets of the HAP slurry formed by atomization were heated while allowed to pass through the furnace to form microparticles. As a result of scanning electron microscopy and X-ray diffraction analysis of the microparticles, they were found to be microspherical sintered bodies of hydroxyapatite having a particle diameter of 0.5–12 μm wherein the individual hydroxyapatite microparticles had been mutually sintered and growth of crystals had occurred.

It is understood that the preceding representative examples may be varied within the scope of the present specification, both as to the substances to be used and the treating conditions, by one skilled in the art to achieve essentially the same results.

As many apparently widely different embodiments of the present invention may be made without departing from the spirit and scope thereof, it is to be construed that the present invention is not limited to the specific embodiment thereof as illustrated in examples except as defined in the appended claims.

What is claimed is:

1. Microspherical sintered bodies of hydroxyapatite prepared by a spray firing process comprising:
    atomizing into a flame a suspension of hydroxyapatite microparticles dispersed in an inflammable organic solvent, or in a mixture of water and an inflammable organic solvent compatible with water, whereby the resulting microdroplets of the suspension of said hydroxyapatite are heated by the heat of the combustion of said inflammable organic solvent or said inflammable organic solvent compatible with water, to instantaneously form microspherical sintered bodies of hydroxyapatite; and
    collecting the formed microspherical sintered bodies of hydroxyapatite.

2. A chromatographic packing material, which comprises microspherical sintered bodies of hydroxyapatite prepared according to the process of claim 1.

3. Microspherical sintered bodies of hydroxyapatite prepared according to the process of claim 1, having a specific surface area of at least 10 $m^2/g$, a porosity of at least 50%, and a mechanical strength of at least 300 $kg/cm^2$.

4. A chromatographic packing material, which comprises the microspherical sintered bodies of hydroxyapatite according to claim 3.

5. Microspherical sintered bodies of hydroxyapatite prepared by a spray firing process comprising:
    atomizing into a flame a suspension having hydroxyapatite microparticles dispersed in an inflammable organic solvent, or in a mixture of water and an inflammable organic solvent compatible with water, whereby the resulting microdroplets of the suspension of the hydroxyapatite are heated by the heat of combustion of said inflammable organic solvent or said inflammable organic solvent compatible with water, to instantaneously form microspherical sintered bodies of hydroxyapatite;
    collecting said formed microspherical sintered bodies of hydroxyapatite; and
    subjecting said sintered bodies of hydroxyapatite to heat treatment at a temperature within the range of 500°–900° C.

6. A chromatographic packing material which comprises microspherical sintered bodies of hydroxyapatite prepared according to the process of claim 5.

7. Microspherical sintered bodies of hydroxyapatite prepared according to the process of claim 5, having a specific surface area of at least 10 $m^2/g$, a porosity of at least 50%, and a mechanical strength of at least 300 $kg/cm^2$.

8. A chromatographic packing material, which comprises the microspherical sintered bodies of hydroxyapatite according to claim 7.

* * * * *